March 19, 1929.  J. R. VANDIVIER  1,706,049
UNITARY ACCELERATOR AND BRAKE CONTROLLER
Filed Nov. 22, 1926
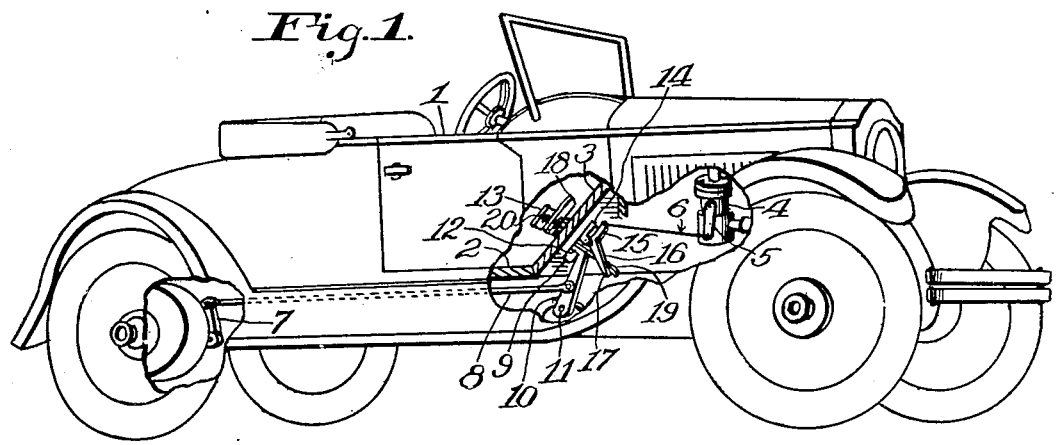
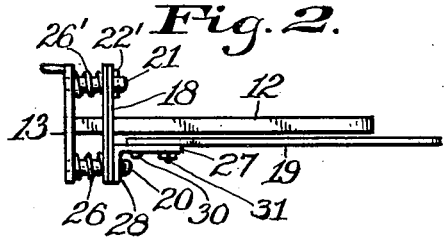
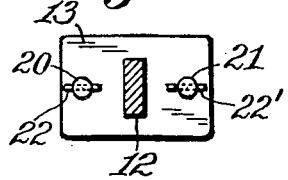
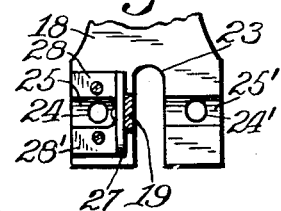
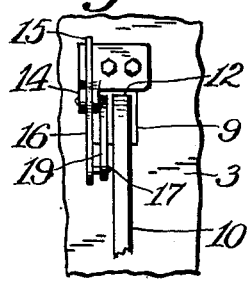
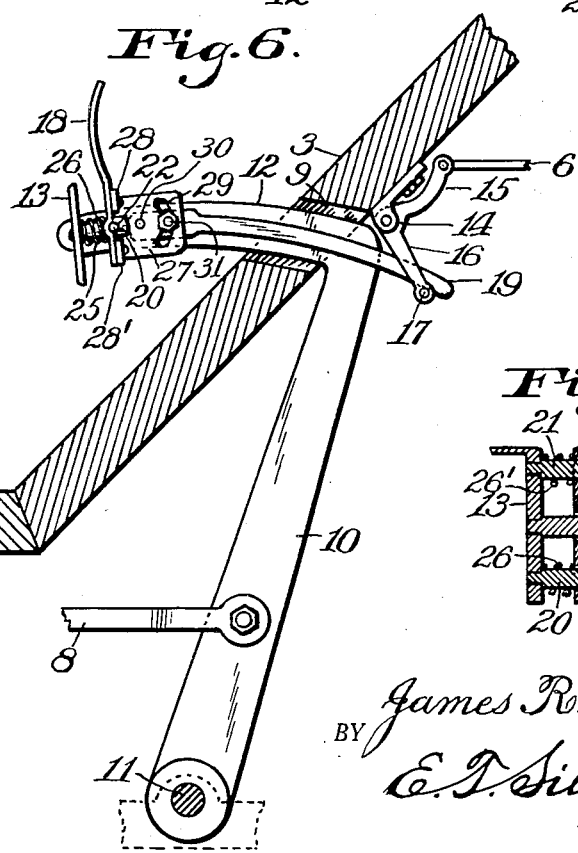
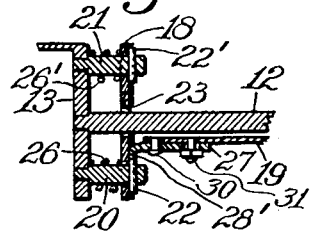
INVENTOR:
James R. Vandivier,
BY
E. T. Silvius,
ATTORNEY.

Patented Mar. 19, 1929.

1,706,049

UNITED STATES PATENT OFFICE.

JAMES R. VANDIVIER, OF FRANKLIN, INDIANA.

UNITARY ACCELERATOR AND BRAKE CONTROLLER.

Application filed November 22, 1926. Serial No. 149,984.

This invention relates to apparatus for facilitating the control of speed of motor-vehicles and relieving drivers of tiresome manipulation in the operations of applying brakes and controlling accelerators, the invention having reference more particularly to unitary apparatus for enabling the driver to control acceleration and retardation of a motor-vehicle without requiring the shifting of a foot from one to another control pedal or foot lever.

An object of the invention is to provide improved means for quickly operating and controlling accelerator devices and brake devices in an efficient manner as will tend to avoid accidents in operation.

Another object is to provide an improved unitary accelerator and brake controller which shall be of simple and reliable construction and adapted for quick use alternatively while permitting the driver to constantly keep a foot in readiness on the usual service brake pedal or lever.

A further object is to provide accelerator controlling apparatus which shall be of such construction as to permit ready application thereof in connection with existing brake pedals, and permitting inexpensive connection to a conventional accelerating rod and a brake rod, and which shall be durable and economical in use.

With the above-mentioned and other objects in view, the invention consists in a plurality of novel devices adapted for cooperative relations and adapted to be applied unitarily to a motor-vehicle and in a novel manner, to be operated and controlled by an operator's foot; the invention consisting also further in the novel parts, and in the novel combinations and arrangements of parts, as hereinafter particularly described and further defined in the claims appended hereto.

Referring to the drawings,—Figure 1 is a perspective view of an automobile partially broken away to disclose the invention applied thereto; Fig. 2 is a top plan of the brake pedal to which the accelerator controller is applied; Fig. 3 is a cross section of a portion of the brake pedal and rear view of the pedal foot plate; Fig. 4 is a plan of a lever plate and details of structure thereof; Fig. 5 is a rear view showing assembly of parts of the invention; Fig. 6 is a sectional view of portions of a motor-vehicle floor and side elevation of the controlling apparatus in connection therewith; and Fig. 7 is a fragmentary section showing details of the improved controlling apparatus.

Similar reference characters in the different figures of the drawings indicate corresponding elements or features of construction herein referred to in detail.

The numeral 1 in the drawing indicates an automobile generally and 2 the floor thereof having an inclined portion 3 within reach of the operator's feet, other features of the automobile being a carburetor 4 having a valve lever 5 to which a push-rod 6 is connected that commonly has been operated by a suitable foot lever arranged on the floor of the motor-vehicle. The motor-vehicle has suitable brake levers 7 provided with a suitable brake rod 8 and such connections as may be desired. The floor portion 3 has a slot 9 therein, and a brake pedal or foot lever is illustrated which comprises a main portion 10 connected to a suitably supported pivot 11, the rod 8 being connected to the main portion, the latter having a relatively angular arm 12 that projects through the slot 9 and has a foot plate 13 rigidly fixed thereto, as commonly constructed and arranged. In practically carrying out the objects of invention the arm 12 is provided with control devices to be operated without disturbing the brake pedal.

Practically embodied the invention comprises a pivot stand 14 suitably mounted on the under side of the inclined floor portion 3 or elsewhere if necessary and it pivotally supports a bell-crank having arms 15 and 16, the arm 15 extending upwardly and being suitably connected to the push-rod 6, the other arm extending downwardly at an inclination adjacent to one side of the slot 9 and having a lateral lug or pin 17 at its end.

The invention includes a novel foot-operated device that is pivotally mounted on the arm 12 and adapted for operating the bell-crank arm 16. The device comprises a lever plate 18 and a relatively angular finger 19 rigidly connected together, preferably so as to be relatively adjusted to change the degree of angularity, one relatively to the other. As preferably constructed the foot plate 13 is provided on its back with two studs 20 and 21 on opposite sides of the arm 12, the studs having pivot pins 22 and 22' respectively, which pins are approximately in alinement. The plate 18 has a slot 23 therein that receives the arm 12 and has also apertures 24 and 24' that loosely receive the studs, the plate being supported on the pivot pins and preferably having concave portions 25 and 25' to guide the plate 18 as it rocks on the pivot pins. Two coil springs 26 and 26' are arranged on the studs respectively and seated against the plates 13 and 18 to hold the latter against the pins, being a convenient form of hinging connection. An angle-plate 27 has foot members 28 and 28' which are secured to the plate 18, and has also a slot 29. The finger 19 is arranged on one side of the angle-plate and has a pivot stud 30 which is connected to the angle-plate 27 at a suitable distance from the slot 29. The finger has also a threaded stud 31 secured thereto that extends through the slot and is provided with a nut whereby the finger is secured to the angle-plate and thereby connected with the lever plate. Preferably the finger 19 is arcuate and arranged on one side of the arm 12, and it extends over the lug 17, so that the finger may be moved longitudinally without disturbing the arm 16.

In practical use the motor-vehicle operator places one foot on the foot plate 13 in readiness to instantly push the arm 12 so as to cause application of the brakes. In order to operate the accelerator the foot is slightly tilted over the plate 13 so as to have contact with the lever plate 18 and slightly move the latter and cause slight movement of the finger 19 downwardly, resulting in the movement of the arm 16 and consequently the arm 15 which pushes the rod 6 as required to increase the supply of fuel necessary to increase speed of the motor-vehicle.

What is claimed as new is:

1. A unitary accelerator and brake controller including a curved brake-control lever arm, a foot-plate fixed to the arm provided with two hinge pins on opposite sides of the arm, a foot-lever supported on the hinge pins and having a curved finger rigidly connected thereto, the finger being arranged at one side of the arm, and a bell-crank having an arm for connection with an accelerator rod and an arm provided with a lateral lug pin to be engaged by the finger, the bell-crank having a pivotal support.

2. In an accelerator and brake controller, the combination with the curved arm of a brake-control lever, of a foot-plate fixed on the lever arm provided with two studs rigid on opposite sides respectively of the arm, two pivot pins secured to the studs respectively, a lever plate having apertures receiving the studs and being supported on said pins, the lever plate having a slot receiving said arm, two coil springs on the studs respectively and seated on the foot-plate and the lever-plate, an angle plate having foot members secured to said lever plate, and an arcuate finger adjustably secured to said angle plate, to operate an accelerator.

3. A unitary accelerator and brake controller comprising a brake-control lever adapted to be pivotally supported and having a relatively angular arm, a foot-plate fixed to the arm and having a pair of pivot studs fixed to the rear side thereof, a foot-lever pivotally connected to the studs and having a finger rigidly connected thereto, the finger being arranged at one side of the arm, and a bell-crank having an arm for connection with an accelerator rod and an arm provided with a lug to be engaged by the finger, the bell-crank having a pivotal support.

In testimony whereof, I affix my signature on the 13th day of November, 1926.

JAMES R. VANDIVIER.